(12) United States Patent
Kuboshima et al.

(10) Patent No.: US 7,845,835 B2
(45) Date of Patent: Dec. 7, 2010

(54) BLINKER INTEGRATED REAR-VIEW MIRROR OF SADDLE-RIDE TYPE VEHICLE

(75) Inventors: Kenichiro Kuboshima, Wako (JP); Hayato Ohashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 302 days.

(21) Appl. No.: 12/209,905

(22) Filed: Sep. 12, 2008

(65) Prior Publication Data

US 2009/0073704 A1    Mar. 19, 2009

(30) Foreign Application Priority Data

Sep. 19, 2007  (JP) .............................. 2007-242982

(51) Int. Cl.
*B62J 6/00*        (2006.01)
(52) U.S. Cl. ...................................... 362/473; 362/545

(58) Field of Classification Search ................. 362/473, 362/474, 494, 543, 544, 545
See application file for complete search history.

(56) References Cited

FOREIGN PATENT DOCUMENTS

| JP | 62-161056 U | 10/1987 |
|---|---|---|
| JP | 2006-069299 A | 3/2006 |
| JP | 2009190702 A * | 8/2009 |

\* cited by examiner

*Primary Examiner*—David V Bruce
(74) *Attorney, Agent, or Firm*—Westerman, Hattori, Daniels & Adrian, LLP

(57) ABSTRACT

A saddle-ride type vehicle includes a vehicle body, a housing body holding a rear-view mirror, and a stay structure provided between the vehicle body and the housing body. The stay structure secures the housing body to the vehicle body. A front blinker is provided in the stay structure.

7 Claims, 5 Drawing Sheets

BLINKER INTEGRATED REAR-VIEW MIRROR OF SADDLE-RIDE TYPE VEHICLE

FIELD OF THE INVENTION

The present invention relates to a blinker integrated rear-view mirror of a saddle-ride type vehicle such as a motorcycle.

BACKGROUND OF THE INVENTION

Conventionally, there has been a saddle-ride type vehicle such as a motorcycle including a rear-view mirror in which a housing that holds a mirror body is supported on a vehicle body with a stay in between, and in which a front blinker is provided integrally in the housing (e.g., Japanese Patent Application Publication No. 2006-69299 and Japanese Utility Model Application Laid-open Publication No. Sho 62-161056).

Such blinker integrated rear-view mirrors aim to enhance the visibility of the front blinker by providing the front blinker to the rear-view mirror projecting outward in the vehicle width direction, and also to improve the external appearance of the vehicle by concentrating security parts therein.

However, the provision of a front blinker may reduce the flexibility of the shape (design) of the housing. For at least this reason, one object of the present invention is to improve the flexibility of the shape of a housing that holds a mirror body in a blinker integrated rear-view mirror of a saddle-ride type vehicle.

SUMMARY OF THE INVENTION

According to one aspect of the present invention, a blinker integrated rear-view mirror of a saddle-ride type vehicle (e.g., motorcycle 1) includes a rear-view mirror (e.g., rear-view mirror 31) in which a housing (e.g., housing body 34) that holds a mirror body (e.g., a mirror body 32) is supported on a vehicle body (e.g., front cowl 22) with a stay (e.g., stay 35) in between. The blinker integrated rear-view mirror is characterized in that a front blinker (e.g., front blinker 41) is provided in the stay.

Accordingly, since the front blinker is disposed outward in the vehicle width direction, the visibility of the front blinker is enhanced. In addition, security parts are concentrated therein, so that the external appearance of the vehicle is enhanced. At the same time, a novel external appearance having the front blinker provided in the stay of the rear-view mirror can be obtained, while the flexibility in the shape (design) around the housing can be enhanced. As a result, the marketability of the vehicle can be further improved.

According to another aspect of the present invention, the front blinker has the same width as the stay in a width direction perpendicular to a longitudinal direction of the stay, when viewed from the front of the vehicle.

Accordingly, the entire width of the stay can be effectively utilized, so that a large light-emitting area of the front blinker can be secured.

According to another aspect of the present invention, the front blinker has an arrow shape indicating an indication direction of the front blinker, when viewed from the front of the vehicle.

Accordingly, the indication direction of the front blinker can be emphasized also by the shape of the light-emitting surface.

According to another aspect of the present invention, the front blinker uses a light-emitting diode as a light source thereof.

Accordingly, the front blinker can be easily arranged in the relatively thin stay, so that the flexibility of the shape (design) of the front blinker can be improved.

BRIEF DESCRIPTION OF THE DRAWINGS

A preferred embodiment of the present invention will be described with reference to the accompanying drawings, wherein.

DETAILED DESCRIPTION OF THE INVENTION

Figure 1:
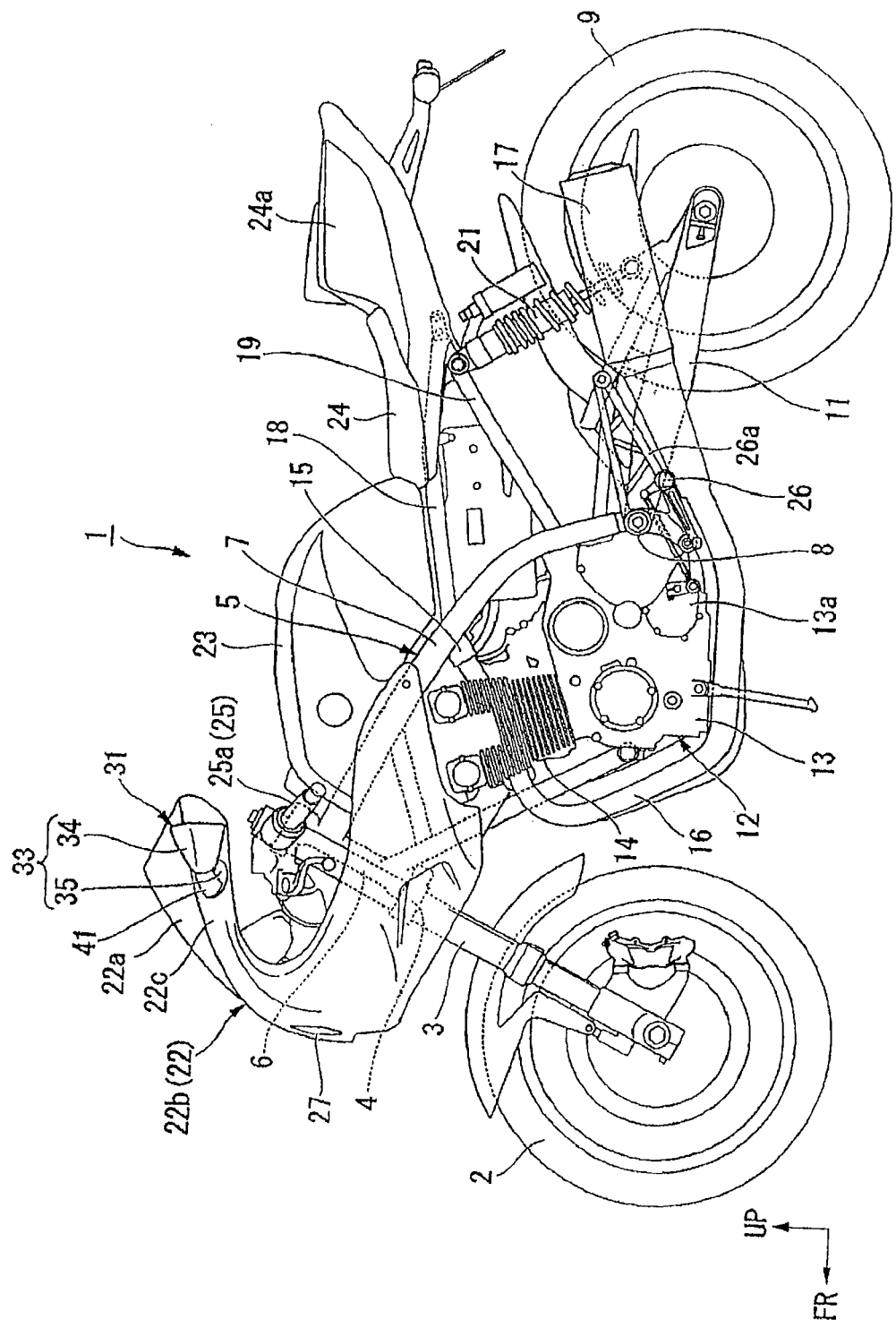
FIG. 1 is a left-side view of a motorcycle according to an embodiment of the present invention.

Embodiments of the invention will be described below with reference to the accompanying drawings. In the descriptions below, directions—front, rear, right, left and the like—are the same as those of the vehicle unless otherwise indicated. In the drawings, the arrow FR indicates the front direction of the vehicle, the arrow LH indicates the left direction of the vehicle, and the arrow UP indicates the upward direction of the vehicle.

As shown in FIG. 1, a front wheel 2 of a motorcycle 1 (saddle-riding type vehicle) is rotatably supported on lower end portions of left and right front forks 3. The upper portions of the front forks 3 are pivotally and steerably supported by a head pipe 6 at the front-end of a vehicle body frame 5, with a steering stem 4. Left and right main frames 7 extend obliquely downward and rearward from the head pipe 6. Left and right pivot portions 8 are integrally provided respectively to rear-end portions (bottom-end portions) of the main frames 7. A swing arm 11, which rotatably supports a rear wheel 9, is pivotally supported, at its front end portion, by the left and right pivot portions 8, so as to be swingable up and down.

An engine 12, serving as a prime mover of the motorcycle 1, is mounted inside the vehicle body frame 5. The engine 12 is a parallel four-cylinder engine with a crank shaft arranged along the vehicle width direction (left and right direction), for example, and includes cylinders 14 standing upright on a crank case 13. A transmission case 13a accommodating a transmission is continuously formed at the rear portion of the crankcase 13. After passing through the transmission, an output of the engine 12 is transmitted to the rear wheel 9 from a left side of the rear portion of the crank case 13 through a chain drive transmission mechanism, for example.

Throttle bodies 15 corresponding to the respective cylinders are connected to the rear portions of the cylinders 14, whereas exhaust pipes 16 corresponding to the respective cylinders are connected to the front portion of cylinders 14. Each exhaust pipe 16 extends downward to a position below the crank case 13 while bending as needed, and then curves to be connected to front-end portions of left and right silencers 17 arranged respectively on both sides of the rear portion of the vehicle body.

The vehicle body frame 5 is formed of multiple kinds of steel materials integrally connected to one another by welding or the like. Front-end portions of substantially horizontal left and right seat rails 18 are connected respectively to the middle portions of the left and right main frames 7. Left and right support frames 19 tilting obliquely rearward and upward are connected, at their front-end portions, respectively to rear portions (bottom portions) of the left and right main frames 7. Rear-end portions of the left and right seat rails 18 and rear-end portions of the left and right support frames 19 are connected to each other. Left and right rear cushion units 21 are arranged, respectively on the left and right sides, each between the connecting portion of the seat rail 18 and the support frame 19, and a rear-end portion of the swing arm 11.

A front cowl 22, covering a periphery of the head pipe 6, the steering stem 4, and the like, is disposed on the upper front side of the vehicle body. A fuel tank 23 supported by the left and right main frames 7 and front portions of the left and right seat rails 18 is disposed at the middle portion, in the front-to-rear direction, of the upper portion of the vehicle body. A rider's seat 24 supported by rear portions of the left and right seat rails 18, as well as a rear cowl 24a continued from the rider's seat 24 are disposed on the upper rear side of the vehicle body.

A handlebar 25 for steering the front wheel is mounted on upper-end portions of the left and right front forks 3 (or the steering stem 4). Left and right steps 26 for a rider is supported at the rear of the left and right pivot portions 8 with left and right step brackets 26a in between, respectively.

A rider straddling the motorcycle 1 takes a riding posture in such a way that the rider sits on the seat 24, places his/her left and right feet respectively on the left and right steps 26, and holds left and right grip portions 25a of the handlebar 25, with his/her left and right hands, respectively.

The upper portion of the front cowl 22 is tilted backward and upward, and wards off a running wind flowing from the front of the vehicle obliquely upward to the rear. Thus, it is possible to reduce the influence of a pressure of the running wind on the upper body of a passenger who is positioned behind the front cowl 22.

Figure 2:
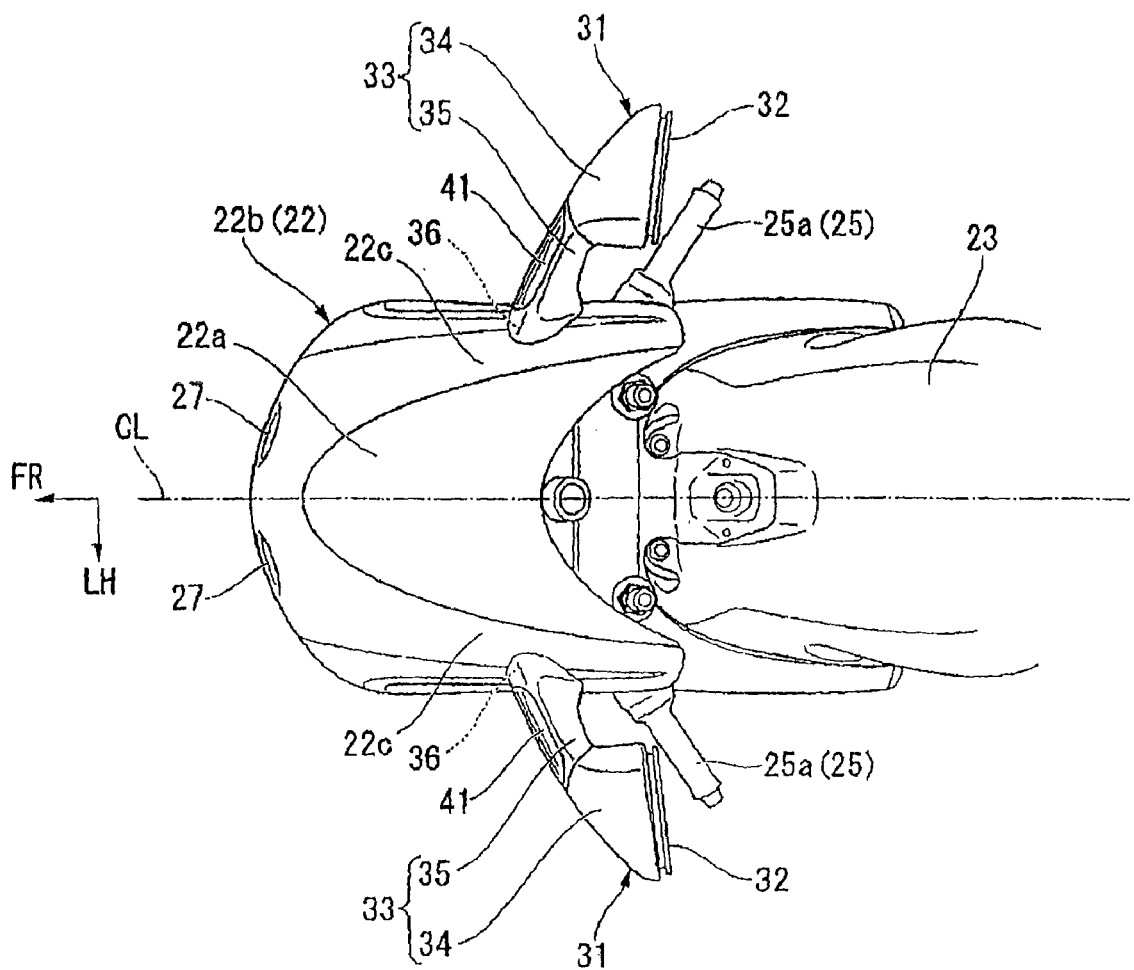
FIG. 2 is a top, plan view of a front portion of a vehicle body of the motorcycle.
Figure 3:
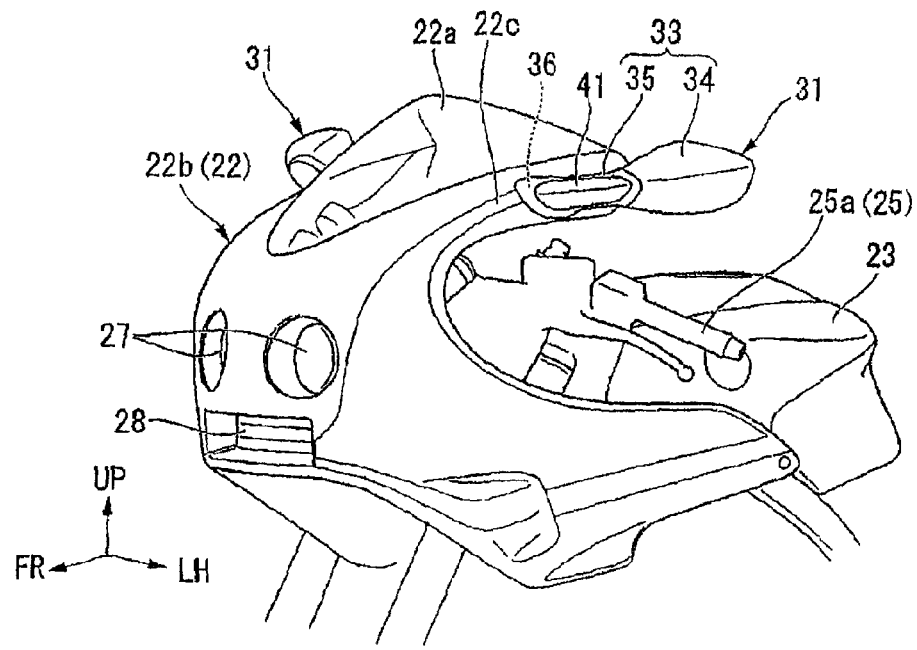
FIG. 3 is a perspective view of the front portion of the vehicle body of the motorcycle.

As shown in FIGS. 2 and 3, a region, on the inner side in the left and right direction, of the upper front cowl 22 is a screen 22a formed of a transparent or translucent resin such as polycarbonate. The region other than the screen 22a of the front cowl 22 is a cowl body 22b formed of an opaque and colored resin such as ABS. Line CL in FIG. 2 indicates a center line in the left and right direction of motorcycle 1.

A pair of left and right rear-view mirrors 31 is attached respectively to left and right sides of an upper portion of the front cowl 22. Each of the left and right rear-view mirrors 31 includes a mirror body 32 forming a mirror surface, and a housing 33 holding the mirror body 32. The housing 33 includes a housing body 34, and a stay 35. The housing body 34 has a cup-like shape with an open rear end, and holds the mirror body 32 in such a way to cover the mirror body 32 from the front. The stay 35 supports the housing body 34 on the vehicle body (the front cowl 22). Dual headlight 27 having left and right two lamps, and an oil cooler 28 for cooling engine oil are arranged on the front portion of the front cowl 22 (see FIG. 3).

The stay 35 extends in the substantially left and right direction (vehicle width direction), on each side of the upper portion of the front cowl 22 (e.g., as extending outward in a slightly oblique manner in the vehicle width direction, the stay 35 is positioned on the rear side, when viewed from the top). A distal-end side (an outer side in the vehicle width direction) of the stay 35 is integrally connected to an inner side, in the vehicle width direction, of the front portion of the housing body 34, and a proximal-end side (an inner side in the vehicle width direction) of the stay 35 is integrally connected to a corresponding one of mirror attachment portions 36 on both sides of the upper portion of the front cowl 22. With the stays 35, the housing bodies 34 that hold the mirror bodies 32 are fixedly supported on the vehicle body (front cowl 22).

Left and right extending portions 22c supporting the left and right sides of the screen 22c as extending obliquely upward and rearward are formed respectively on the sides of the upper portion of the cowl body 22b. The left and right extending portions 22c form tilted outer surfaces each being lowered as extending outward in the vehicle width direction. The mirror attachment portions 36 are provided to middle portions, in the front-to-rear direction, of the respective left and right extending portions 22c. Each of the left and right mirror attachment portions 36 is reinforced, from the inner side in the vehicle width direction, by a part of an unillustrated cowl stay supported on the vehicle body frame.

The left and right mirror attachment portions 36 are positioned above and in front of the left and right grip portions 25a of the handlebar 25. While being attached respectively to the left and right mirror attachment portions 36, the stays 35 of the left and right rear-view mirrors 31 extend up to positions equivalent, in the vehicle width direction, to those of the middle portions of the left and right grip portions 25a of the handlebar 25. The housing body 34 and the mirror body 32 supported on a distal end side of each stay 35 are provided to protrude further outward in the vehicle width direction than the tip end of the corresponding one of the left and right grip portions 25a of the handlebar 25 (see FIG. 2).

The housing body 34 and the stay 35 are integrally formed into a single component made of resin here. However, these components may be separate from each other. Moreover, each of these components may have an integrated structure or a divided structure, and further, a part or the whole of these components may be formed of a metal such as an aluminum alloy.

The housing body 34 tiltably holds the mirror body 32, so that the angle of the mirror surface of the mirror body 32 can be adjusted by tilting the mirror body 32. It is also possible to alternatively employ a configuration in which the housing body 34, fixedly holding the mirror body 32, can tilt with respect to the stay 35, or a configuration in which the stay 35 can tilt with respect to the front cowl 22.

Below, although descriptions will be given with reference to FIGS. 4 to 7 showing the right rear-view mirror 31, the left rear-view mirror 31 has the same configuration unless otherwise stated.

Figure 4:
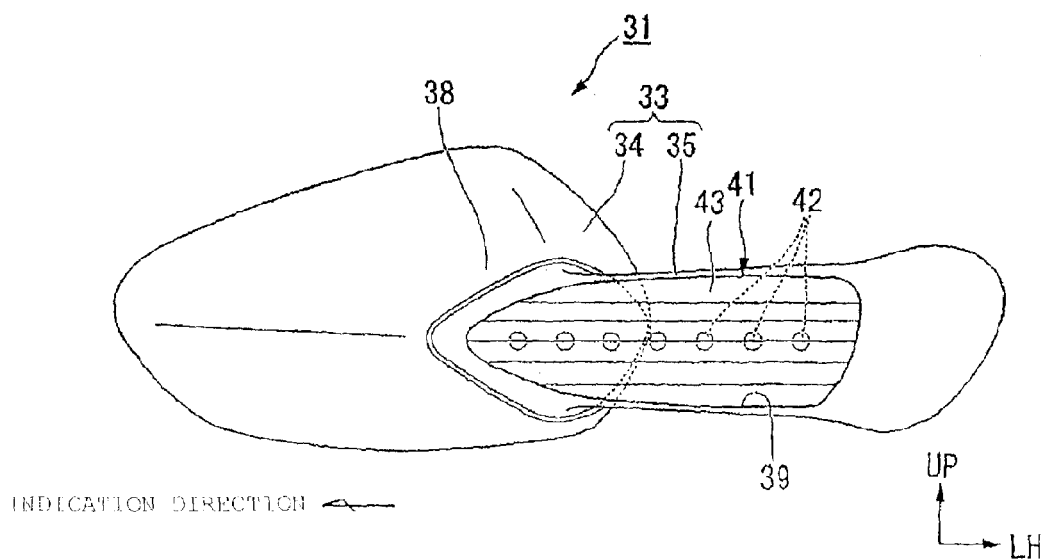
FIG. 4 is a front, elevational view of a right rear-view mirror of the motorcycle.
Figure 5:
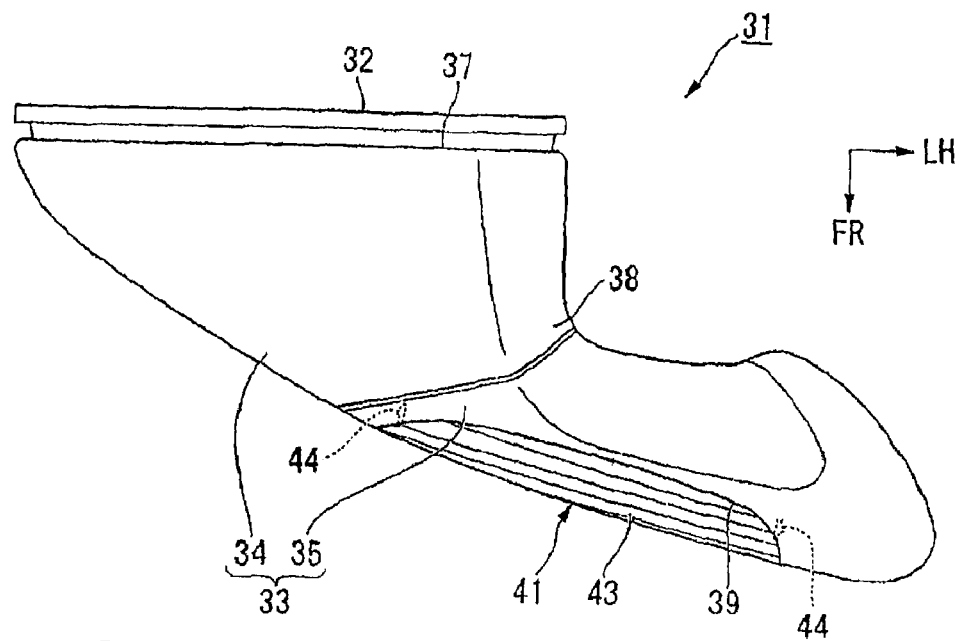
FIG. 5 is a top, plan view of the right rear-view mirror.

As shown in FIGS. 4 and 5, each housing body 34 is shaped, for example, like a deformed pentagon having an outer side in the vehicle width direction, which side extends to the left and right as viewed from the front. A rear opening 37 is formed along the shape of the housing body 34, and the mirror body 32, having the same shape as that of housing body 34, is supported with a spherical joint or the like in a manner to close the rear opening 37. A base portion 38 is formed on an inner side in the vehicle width direction of the front portion of housing body 34, and is shaped like a deformed rhombus having an outer side in the vehicle width direction, which extends to the left and right as viewed from the front. The distal end portion of the stay 35 is continuously connected to the base portion 38.

Figure 6:
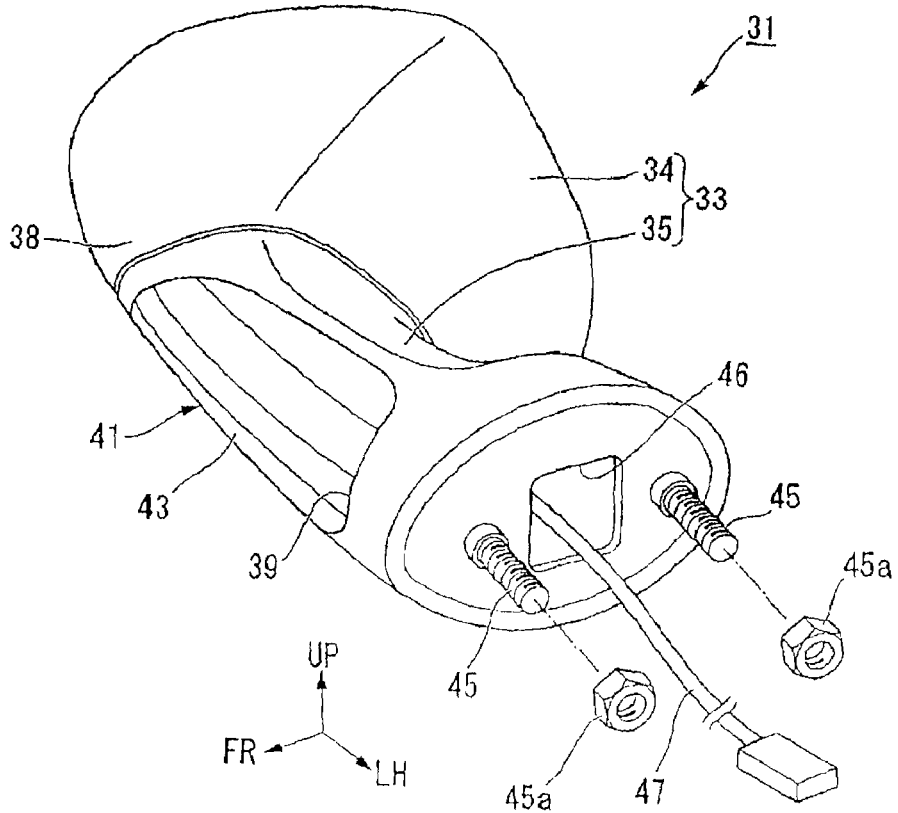
FIG. 6 is a perspective view of the right rear-view mirror as viewed from an inner side in the vehicle width direction.

As shown in FIG. 6, stay 35 has its proximal end portion having an ellipsoidal cross-sectional shape being long in the front-to-rear direction, and extends outward in the vehicle width direction while slightly tapering from the proximal end portion. A cross section of the stay 35 is substantially a rhombus in shape, except for the base end side having the elliptical shape. The top end side of stay 35 has an elliptical shape similar to the shape of base portion 38, and is connected to the base portion 38.

A front blinker 41 of motorcycle 1 is integrally provided to the front portion of the stay 35. The front blinker 41 includes: multiple (seven in this embodiment) LEDs (light-emitting diodes) 42 serving as a light source thereof in the stay 35 having a hollow tubular shape; and a blinker lens 43 that is transparent or translucent formed in a front wall portion of the stay 35.

The LEDs 42 are arranged in a line along the extending direction of the stay 35, for example. Irradiation light from the LEDs 42 is diffused by the blinker lens 43 located in front (in the irradiation direction) of the LEDs 42 so that a predetermined amount of light is emitted from the entire blinker lens 43. Thus, the blinker lens 43 secures a predetermined light-emitting area as the front blinker 41.

The blinker lens 43 is disposed in a horizontally long manner along the direction in which the LEDs 42 are arranged (in other words, along the extending direction of the stay 35). Multiple stepwise lens cuts are formed in the blinker lens 43, each extending along the extending direction of the blinker lens 43. The lens cuts are provided so as to be continuous with a ridge line on the outer surface of the outer side, in the vehicle width direction, of housing body 34. Thus, the lens cuts contribute to formation of the integral external appearance of the whole rear-view mirror 31.

In the front view of the blinker lens 43, the end portion on the outer side in the vehicle width direction thereof is provided to protrude like a mountain outward in the vehicle width direction (the indication direction of the front blinker 41); thus, the indication direction of the front blinker 41 is also emphasized by the shape of the light-emitting surface. Moreover, in the front view of the blinker lens 43, the vertical width of the blinker lens 43 and the vertical width of the stay 35 are substantially the same, and thus a large light-emitting area to the front of the vehicle can be secured.

Figure 7:
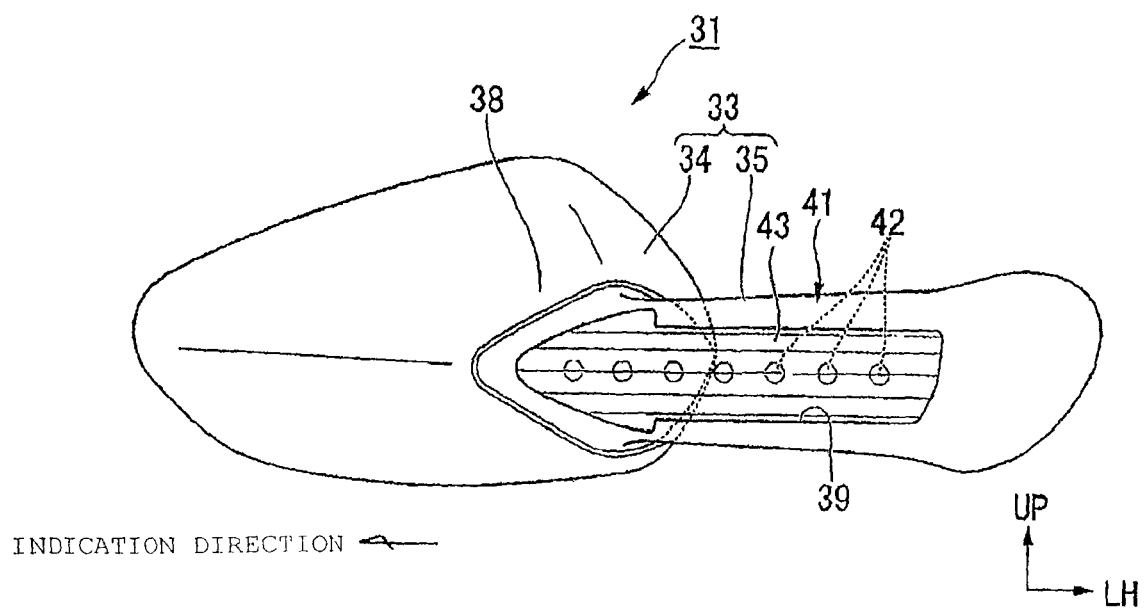
FIG. 7 is a front, elevational view corresponding to FIG. 4 and showing a modification of the right rear-view mirror.

It should be noted that the vertical width of the blinker lens 43 may be smaller than the vertical width of stay 35. In this case, as shown in FIG. 7, the shape of blinker lens 43 as viewed from the front may be an arrow shape indicating the indication direction, and thus the indication direction of the front blinker 41 may also be emphasized by the shape of the light-emitting surface in the same manner as the above-described configuration. Moreover, the horizontal width of the blinker lens 43 may be set as appropriate within the range of the entire length of the stay 35.

An opening 39 for attaching the blinker lens 43 is formed in the front wall portion of the stay 35. The blinker lens 43 is attached to the stay 35 so as to close the opening 39 from the front. Locking claws 44 are provided respectively to the left and right sides of the blinker lens 43 (see FIG. 5). Each of the locking claws 44 engages with the inner side of the opening 39, so that the blinker lens 43 is attached to the stay 35.

As shown in FIG. 6, a pair of front and rear screw shafts 45, for example, protrude inward in the vehicle width direction from the proximal end portion of the stay 35. These screw shafts 45 are inserted into the mirror attachment portion 36 of the front cowl 22, and then, nuts 45a are screwed onto, and fixed tightly to the screw shafts 45 from an inner side of the front cowl 22. In this manner, the stay 35 is, and further, the rear-view mirror 31 is fixedly attached to the front cowl 22.

An operation hole 46 is formed in the center of the proximal end portion of the stay 35. A power supply harness 47 for the front blinker 41 is drawn to the outside of the rear-view mirror 31 through the operation hole 46. The power supply harness 47 is laid and extended appropriately inside the front cowl 22 so as to be connected to a main harness of the motorcycle 1, for example. It should be noted that the blinker lens 43 can be detached from the stay 35 by releasing the engagement of the locking claws 44 through the operation hole 46. Here, it is possible to alternatively employ a configuration in which one of the left and right sides of blinker lens 43 is fixed by a locking claw, and the other one is fixed by a screw.

As described above, the blinker integrated rear-view mirror of the above embodiment is to be employed in the saddle-ride type vehicle (the motorcycle 1) including the rear-view mirror 31 in which the housing body 34 holding the mirror body 32 is supported on the vehicle body (the front cowl 22) with the stay 35. Moreover, the front blinker 41 is provided in the stay 35.

With this configuration, for example, since the front blinker 41 is disposed outward in the vehicle width direction, the visibility of the front blinker 41 is enhanced. In addition, security parts are concentrated therein, so that the external appearance of the vehicle is enhanced. At the same time, a novel external appearance having the front blinker 41 provided in the stay 35 of the rear-view mirror 31 can be obtained, while the flexibility in the shape (design) around the housing body 34 can be improved. As a result, the marketability of the vehicle can be further improved.

Moreover, as compared with the case where the front blinker 41 is provided to the housing body 34, influence of disturbance on the front blinker 41 can be suppressed, the length of the power supply harness 47 can be reduced, an increase in the weight of the tip end of rear-view mirror 31 can be suppressed, and the space inside the stay 35 can be effectively utilized.

Further, in the above blinker integrated rear-view mirror, the front blinker 41 has the same width as the stay 35 in the width direction perpendicular to the longitudinal direction of the stay 35, when viewed from the front. Thus, the entire width of the stay 35 can be effectively utilized, so that the large light-emitting area of the front blinker 41 can be secured.

Furthermore, in the above blinker integrated rear-view mirror, the front blinker 41 uses the LEDs 42 as its light source. Thus, the front blinker 41 can be easily arranged in the relatively thin stay 35, so that the flexibility in the shape (design) of the front blinker 41 can be improved.

It should be noted that the present invention is not limited to the above embodiment. For example, a configuration can be adopted in which multiple light sources sequentially light up, while blinking, in a direction from the inner side in the vehicle width direction to the outer side in the vehicle width direction (toward the indication direction of the front blinker 41), so that the indication direction is further emphasized.

In addition, the front blinker 41 may use, as its light source, a bulb having a filament. However, when the front blinker 41 uses an LED as its light source, the flexibility in the shape (design) of the light-emitting body is high. Thus, this configuration is preferably employed even when the light-emitting body is to be formed in a thin part such as the stay 35.

The configuration of the above embodiment is an example of the present invention, and it is a matter of course that the present invention can be applied to a three- or four-wheeled vehicle and even a bicycle in addition to a motorcycle (including a scooter-type vehicle), and further, various modifications can be made without departing from the scope of the present invention.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A saddle-ride type vehicle, comprising:
   a vehicle body;
   a housing body holding a rear-view mirror; and
   a stay structure provided between said vehicle body and said housing body, for securing said housing body to said vehicle body, wherein
   said stay structure includes a front blinker.

2. The saddle-ride type vehicle according to claim 1, wherein said front blinker has substantially the same width as that of said stay structure in a width direction, perpendicular to a longitudinal direction of said stay, when viewed from a front side of the vehicle.

3. The saddle-ride type vehicle according to claim 1, wherein said front blinker has an arrow-like shape indicating a direction of said front blinker, when viewed from a front side of the vehicle.

4. The saddle-ride type vehicle according to claim 1, wherein said front blinker uses a light-emitting diode as a light source thereof.

5. The saddle-ride type vehicle according to claim 1, wherein said stay structure and said housing body are integrally formed into a single component.

6. The saddle-ride type vehicle according to claim 1, wherein said stay structure is a separate component from said housing body.

7. A saddle-ride type vehicle, comprising:
   a vehicle body;
   a housing body holding a rear-view mirror; and
   a stay structure provided between said vehicle body and said housing body, for securing said housing body to said vehicle body, wherein
   said stay structure includes a front blinker, and
   said front blinker has substantially the same width as that of said stay structure in a width direction, perpendicular to a longitudinal direction of said stay, when viewed from a front side of the vehicle.

* * * * *